Figure 1:
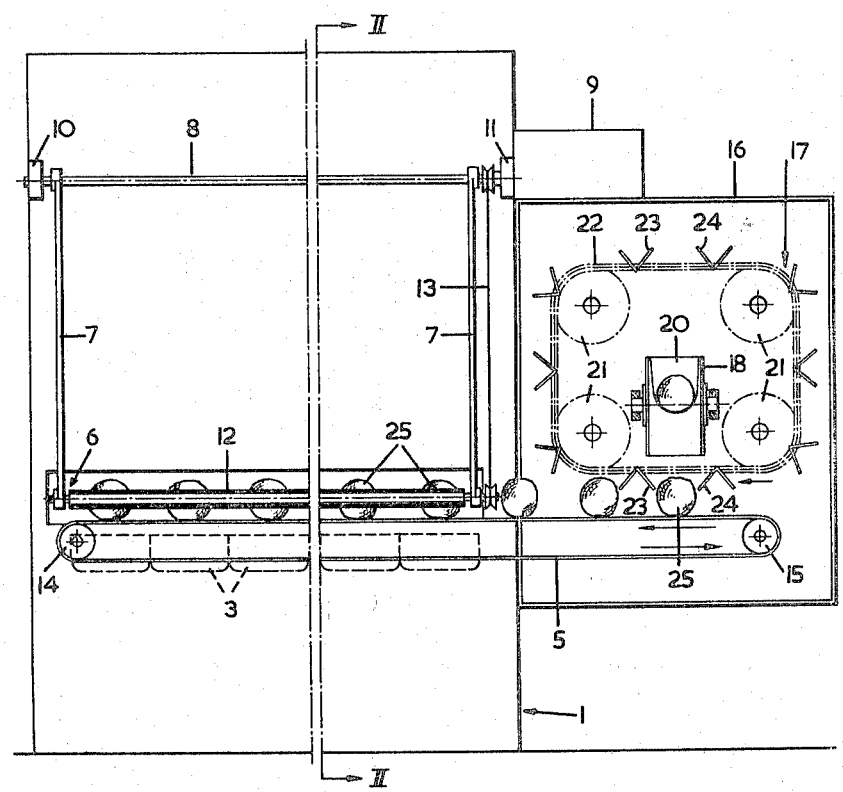

Pieter Johannes Benier
INVENTOR.

BY Wenderoth, Lind
and Ponack, attorneys

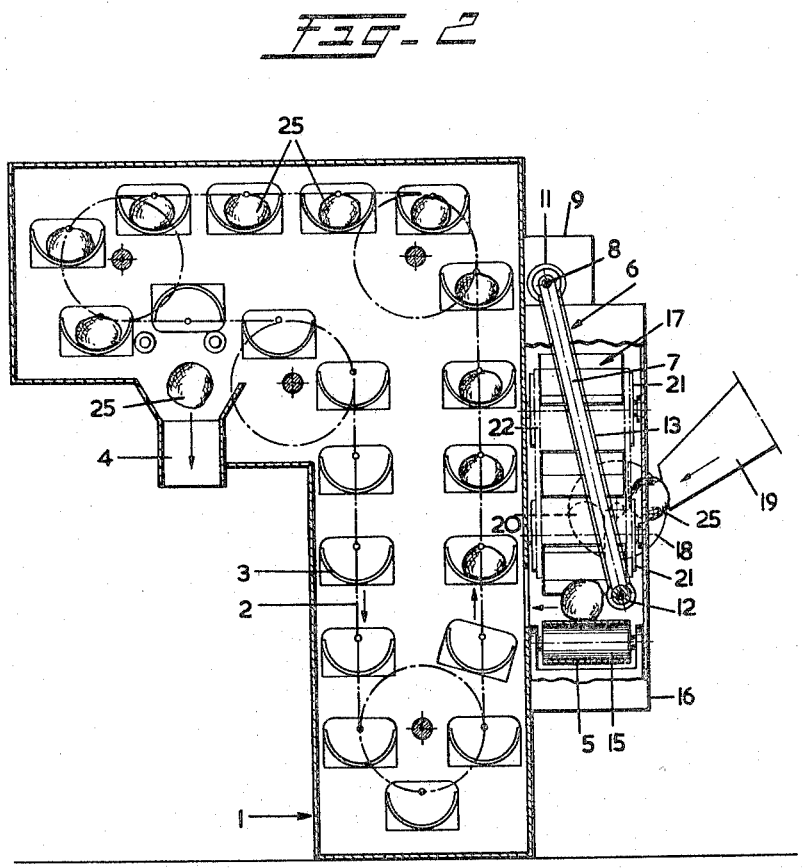

3,295,656
METHOD AND APPARATUS FOR HANDLING DOUGH BALLS
Pieter Johannes Benier, Voorburg, South Holland, Netherlands, assignor to N.V. Nederlandsche Fabriek van Bakkerijwerktuigen v/h G.J. Benier, The Hague, Netherlands
Filed June 15, 1965, Ser. No. 464,123
Claims priority, application Netherlands, June 16, 1964, 6,406,813
1 Claim. (Cl. 198—24)

The present invention relates to an apparatus for handling dough balls, and more particularly to an apparatus in which means are used for supplying dough balls to a plurality of dough ball holders arranged in series next to each other and moving round in a cycle in a rising box, of which holders a vertically moving series periodically passes a horizontally moving feed belt or the like to receive a series of dough balls simultaneously pushed off said belt, which feed belt moves along a synchronizing mechanism adapted to successively position the dough balls originating from a preceding processing step on the feed belt in places corresponding with the spaced intervals of the dough ball holders arranged in a series.

Prior apparatus of this type have the disadvantage that, despite the synchronizing means used, the dough balls coming from a measuring machine and normally fed to the rising box by way of a rounding machine are not positioned accurately enough on the feed belt, owing to which it may happen that more than one dough ball falls into a holder, which may cause a drastic interruption of the operations. This drawback is felt more strongly according as the rate of production is set higher, for example, 3600 balls per hour, or more. The rates of transport required to this end involve that slight differences in the moment of transfer of a dough ball from one member to the next one create proportionally large deviations with respect to the right place on this next member.

According to the invention the above drawback is eliminated by a method which comprises dropping each ball through a transmitting channel synchronously moving along with the carrier and growing narrower towards the carrier as measured in the direction of travel, which method can be applied in the said apparatus by providing the sychronizing mechanism with guiding faces periodically moving above the feed belt and synchronously therewith over some distance, said guiding faces converging in pairs towards the belt and defining a transmitting channel having a restricted outlet relative to its inlet as seen in the direction of travel of the belt. Owing to this the dough balls, the diameter of which substantially corresponds with the width—as seen in the direction of the belt—of the outlet, of the transmitting channel, even if, due to the varying properties of the dough and the surface of the dough balls, the moment at which the dough balls are entirely free from the last member that in the series of operations precedes the feed belt, highly varies with respect to the moment proper for the synchronization, will still fall without interference into the transmitting channel via the wider inlet, whereafter the convergence of the said guiding faces rectifies the position of the dough balls relative to the feed belt when falling through the channel. When the dough balls fall out of the transmitting channels, any adhesion of the dough balls to a guiding face or one of its edges for a longer or shorter period of time will not result in a deviation relative to the proper positioning on the feed belt, because during the transmitting phase the channels move synchronously with the feed belt.

The design of the guiding faces may vary. For example, they may also form part of transmitting chutes more or less closed all around.

With reference to the accompanying drawings one embodiment of the invention will now be described, by way of example.

Referring to the drawings,
FIG. 1 is a front elevation of an apparatus according to the invention, and
FIG. 2 is a cross-sectional view along the line II—II in FIG. 1.

The rising box 1, as shown in the drawings, is provided with successive, horizontal series of dough ball holders 3 which are moved around therein by a conveyor chain 2 and cause the dough balls 25 to fall out of the box 1 through the action of a dumping mechanism at 4, and which are filled with fresh balls 25 when passing the feed belt 5 through the intermediary of a swivel member 6 which, with an abrupt movement, pushes the balls 25, which have then just been aligned with the holders 3 by the belt 5, off this belt. The swivel member 6 consists of two swivel arms 7 which have their upper ends mounted to a shaft 8 extending into a drive box 9 and supported at 10 and 11. The arms 7 carry a pushing roller 12 at their lower ends, which is kept in permanent rotation from the box 9 by means of a string transmission 13 to allow the balls 25 to be pushed off and enable them to roll down the belt 5.

The feed belt 5 passes around rollers 14, 15, of which the latter is driven from the auxiliary box 16, wherein is mounted the synchronizing mechanism 17 according to the invention. In addition to mechanism 17 there is provided a pre-synchronization disc 18 which accommodates the balls 25 coming from the discharge chute 19, only shown in FIG. 2, of a rounding machine in one of its peripheral recesses 20, and, after rotation through 180°, tries to release them again at the right moment. If desired, the pre-synchronization disc 18 may be replaced with a different pre-synchronization mechanism, or, when the pre-located machine, satisfactorily matching the system, releases the balls 25, left out at all.

Secured to a chain 22 of the mechanism 17 passing around wheels 21 are pairs of converging guiding faces 23, 24, which periodically travel above the belt 5 synchronously with said belt under the pre-synchronization disc 18 and receive a ball 25 falling out of the disc 18 and guide it to the proper position on the belt 5.

As a result of the synchronous travelling movement of the guiding faces 23, 24 with the belt 5 the sound operation of the apparatus is to a large extent independent of the moment at which a dough ball 25 is completely released by the faces 23, 24, and also, as a result of the larger mutual distances between the tops of the faces 23, 24, of the moment at which a dough ball 25 is completely released from the disc 18.

The height of the synchronizing mechanism 17 above the belt 5 may vary. Attention should be paid that the elements 23, 24, when moving upwards around a wheel 21, can pass freely along the balls 25.

The above-described method can be applied in all those cases in which a uniform positioning of the dough balls on a moving carrier is required, even when an apparatus is involved which is different from the one described hereinbefore.

I claim:
An apparatus for processing dough balls comprising a rising box, a plurality of dough ball holders in said rising box arranged in a plurality of parallel horizontal rows connected alongside of each other in a chain of spaced rows, means mounting said chain of rows movably through a vertical path, a conveyor for feeding dough balls to said rising box through a horizontal feeding path in front of said chain of rows in its vertical path, pusher means extending in front of said chain of rows above and parallel to said conveyor, means for periodically moving said pusher means over said conveyor transversely thereof, supplying means having its discharge means arranged above said conveyor for dropping dough balls thereon one after another, guiding means for guiding said dough balls when dropped from said discharge means, said guiding means comprising pairs of guiding faces arranged in a row, said pairs of guiding faces being spaced equally to the spacing of said dough ball holders in their rows, means mounting said row of pairs of guiding faces movably through a path parallel to said conveyor between said discharge means and said conveyor, the guiding faces of said pairs of guiding faces when moving through their path between said discharge means and said conveyor converging towards said conveyor to define a transmitting channel having a restricted outlet relative to its inlet as seen in the direction of said conveyor, and driving means for driving said conveyor and said row of guiding faces with equal speed and synchronously with said supplying means.

References Cited by the Examiner

UNITED STATES PATENTS 3,224,162  12/1965  Scolland _____ 53—249

EVON C. BLUNK, *Primary Examiner.*

RICHARD E. AEGERTER, *Examiner.*